United States Patent [19]

Ulbrich

[11] Patent Number: 5,582,420
[45] Date of Patent: Dec. 10, 1996

[54] MODIFIED COUPLER SYSTEM AND METHOD FOR RETROFITTING SAME

[76] Inventor: Dennis R. Ulbrich, 1706 Avenue J, Hondo, Tex. 78861

[21] Appl. No.: 471,998

[22] Filed: Jun. 6, 1995

[51] Int. Cl.⁶ ..................................................... B60D 1/58
[52] U.S. Cl. ........................................ 280/507; 280/512
[58] Field of Search .................................. 280/504, 507, 280/511, 512, 513; 70/58

[56] References Cited

U.S. PATENT DOCUMENTS

| | | | |
|---|---|---|---|
| 2,716,471 | 8/1955 | Long | 280/512 X |
| 3,797,283 | 3/1974 | Honer | 70/58 |
| 3,820,823 | 6/1974 | Beaston | 280/512 |
| 4,082,311 | 4/1978 | Hamman | 280/507 |
| 4,133,553 | 1/1979 | Pierce | 280/512 X |
| 4,157,190 | 6/1979 | Nyman | 280/512 |
| 4,459,832 | 7/1984 | Avrea et al. | 280/507 X |
| 4,776,607 | 10/1988 | Richter et al. | 280/507 |
| 4,778,196 | 10/1988 | Spliansky | 280/512 |
| 4,804,204 | 2/1989 | Elkins | 280/512 |
| 4,898,400 | 2/1990 | Elkins | 280/512 X |
| 4,925,205 | 5/1990 | Villalon et al. | 280/507 |
| 5,154,440 | 10/1992 | Dolan et al. | 280/507 |
| 5,222,755 | 6/1993 | O'Neal | 280/507 |

OTHER PUBLICATIONS

Jun. 1995 Omni Towing Products Brochure.

*Primary Examiner*—Kevin Hurley
*Attorney, Agent, or Firm*—Gunn, Lee & Miller

[57] ABSTRACT

A coupler system attachable to a hitchball and a method and kit for retrofitting existing couplers where a lock hasp receiving opening is provided in a free end of a closing lever on the coupler and a lock pin opening is provided in the coupler frame. A lock pin with an eyelet is insertable in the lock pin opening and the eyelet is alignable with the hasp receiving opening. A lock hasp may be passed through the eyelet and the hasp receiving opening to lock the collar of the coupler in a closed position to prevent the unauthorized insertion or removal of a hitchball.

3 Claims, 2 Drawing Sheets

5,582,420

MODIFIED COUPLER SYSTEM AND METHOD FOR RETROFITTING SAME

BACKGROUND OF THE INVENTION

The present invention relates to couplers, and more particularly to couplers for securing a trailer to a hitchball attached to a vehicle. A standard coupler may be modified to provide the locking system of the present invention which ensures that when coupled to the hitchball the modified coupler will not be released, and when uncoupled from the hitchball, the hitchball receiving cavity may be locked closed thereby preventing unauthorized recoupling to a hitchball.

Existing couplers are normally provided with a separate cylindrical retaining pin which is insertable into a side hole rearward of the sleeve collar to prevent the rearward movement of the collar when the coupler is in the closed position. However, there is no means for positively locking the collar in the forward closed position to prevent the unauthorized insertion or removal of a hitchball. Further, the retaining pin is easily lost from the side hole.

Existing trailer hitches are shown in U.S. Pat. Nos. 3,797,283; 4,459,832; 4,776,607; 4,925,205; 5,154,440; and 5,222,755. However, nothing in the art teaches positively and directly securing the lever linkage in a closed, locked position. As will be described below, the present invention allows the coupler to be locked in a closed position to prevent the unauthorized insertion of a hitchball in an attempt to steal the trailer to which the coupler is mounted.

SUMMARY OF THE INVENTION

The present invention provides an improved coupler system which may be incorporated into the original manufacture of a coupler; or, alternatively, a method is provided for the retrofitting of an existing standard coupler to achieve the improvements of the system. A kit is described for retrofitting such existing couplers.

An existing coupler may be retrofitted by drilling a hasp receiving opening in the free end of a closing lever of the coupler and then drilling a lock pin opening at a location on the coupler frame. A locking pin with an eyelet on a first end is then inserted at a second end into the lock pin opening while the coupler collar is in the closed position. The eyelet is thus in alignment with the lock hasp receiving opening such that a lock hasp may be passed through the eyelet and the hasp receiving opening to lock the collar in the closed position thereby preventing the unauthorized insertion or removal of the hitchball.

BRIEF DESCRIPTION OF THE DRAWINGS

The invention will be better understood and objects other than those set forth above will become apparent when consideration is given to the following detailed description of the preferred embodiments. Such description makes reference to the annexed drawings wherein.

DETAILED DESCRIPTION OF THE PREFERRED EMBODIMENT

Figure 1:
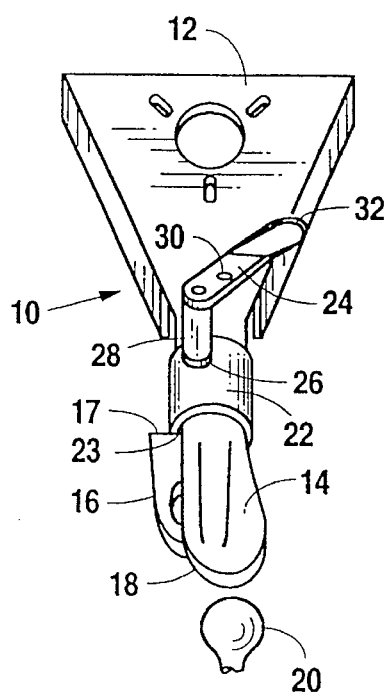
FIG. 1 is a top, front perspective illustration of a standard prior art coupler in the open position.

While the invention is susceptible to various modifications and alternative constructions, a certain illustrated embodiment has been shown in the drawings and will be described in detail. It should be understood, however, that there is no intention to limit the invention to the specific embodiment illustrated and described.

Turning to FIG. 1 there is illustrated a top, front perspective view of a standard coupler 10 of the prior art, such as the OMNI Heavy Duty A-Frame (model 290006) Coupler or the Hammer Blow Bulldog Trailer Coupler, or equivalent. It is well understood in the art that the coupler 10 is mountable on a trailer (not shown) by means of conventional fasteners attached to the frame member 12. At the front end of the frame member 12 is the tongue portion 14. The tongue includes a pivotal locking jaw 16 which opens to receive in a receiving cavity 18 a standard hitchball 20, the structure and operation of which are well known in the art. Hitchball 20 is attached, as is well known, to a prime mover such as an automobile or truck (not shown).

The receiving cavity 18 and locking jaw 16 are open when sleeve collar 22 is in a rearward position along tongue 14 as shown in FIG. 1. Jaw 16 pivots outwardly to the side of the tongue about a pivot hinge at the front of the tongue 14. Jaw 16 is urged outwardly by a spring member (not shown) when the forward edge 23 of the collar 22 moves past the rearward edge 17 of the jaw 16.

Collar 22 is slidable along the tongue portion 14 by operation of a lever linkage 24. Lever linkage 24 is securely attached at a first end 26 of a link 28 to the collar 22. Attachment may be by any conventionally known fastener means or method such as welding or by use of a bolt, rivet, or screw. Lever linkage 24 is attached to the frame 12 at pivot midpoint 30. A free end 32 of the lever linkage 24 is the location where the operator may apply force to pivot the linkage 24 and move the collar 22 forwardly to close the coupler or rearwardly to open the coupler.

Figure 2:
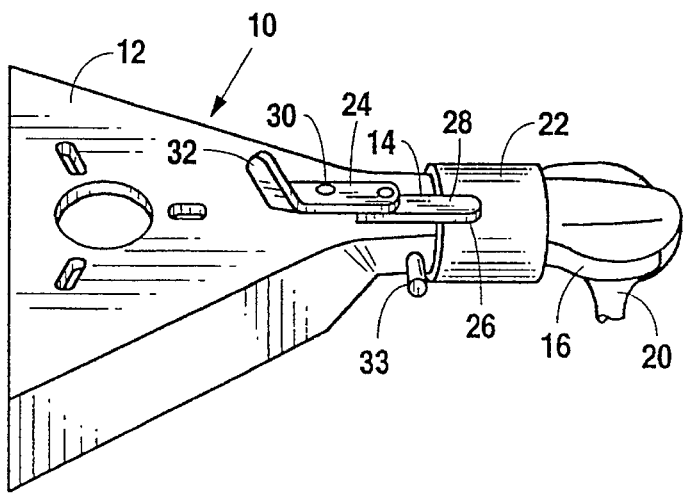
FIG. 2 is a top, right side perspective view of a standard prior art coupler in the closed position.

FIG. 2 illustrates a prior art coupler 10 in the closed position with the hitchball 20 secured in the cavity 18. It may be seen in FIG. 2 that the linkage lever 24 has been pivoted to urge the collar 22 forward thereby closing jaw 16. Cavity 18 is closed around the hitchball 20. A collar pin 33 is shown inserted in an opening in the tongue portion 14 for preventing the collar 22 from sliding rearwardly and allowing the jaw 16 to open. Pin 33 is not positively attached to the collar 22 by way of any direct linkage structure and may be easily dislodged, lost, or misplaced. Further, there is nothing teaching that collar pin 33 may be locked into place requiring an authorized key for removal of the pin 33.

Figure 3:
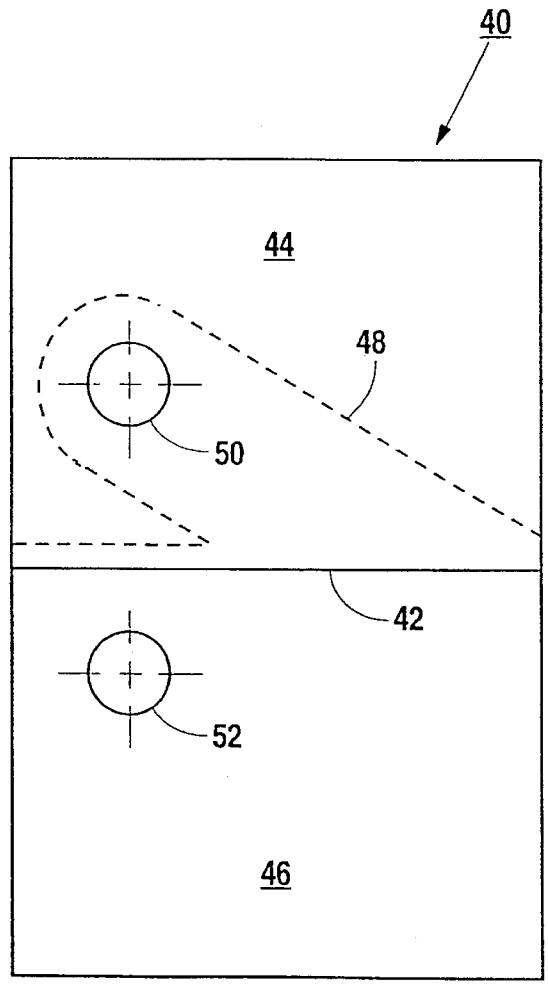
FIG. 3 is a top plan view of the templet of the present invention.

FIG. 3 illustrates a templet 40 of the present invention in a top plan view. Printed on the templet 40 are indicia to properly position the templet on the standard coupler 10 for drilling holes to modify the coupler. The templet 40 is constructed of a piece of generally rectangular, stiff, paper material with a fold line 42 dividing the templet into an upper section 44 and a lower section 46.

Upper section 44 is provided with a broken line representation 48 of the free end 32 of lever linkage 24 and a graphic representation 50 of a 7/16" diameter circle. The lower section 46 is provided with a graphic representation 52 of a second 3/8" diameter circle. Circle 50 will correspond to a lock hasp receiving opening to be formed in the lever linkage 24, while circle 52 will correspond to a lock pin opening to be formed in the frame as will be discussed below.

Figure 4:
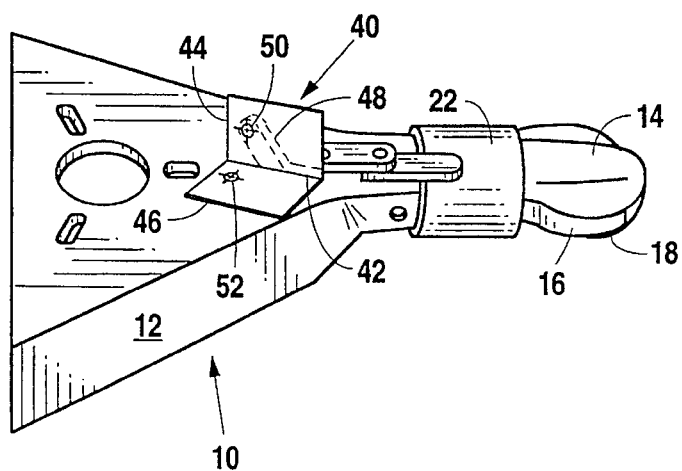
FIG. 4 illustrates the placement of the templet on the standard coupler for locating the proper location for drilling in the present invention.

In order to modify an existing coupler, templet 40 is folded along fold line 42 to form a 90° angle. As may be seen in FIG. 4, folded templet 40 is positioned on coupler 10 while the lever linkage 24 is in the closed position closing the hitchball receiving cavity 18 and urging collar 22 forward. Broken line 48 is aligned with the free end 32 of the lever 24. Alternatively, templet 40 may be cut along broken line 48 to create a templet edge substantially corresponding to the outer edge of the free end 32. Once the upper section 44 is aligned with end 32, the lower section 46 is placed against the frame 12. The center of circle 50 is marked on the free end 32 and the center of circle 52 is marked on the frame 12.

Figure 5:
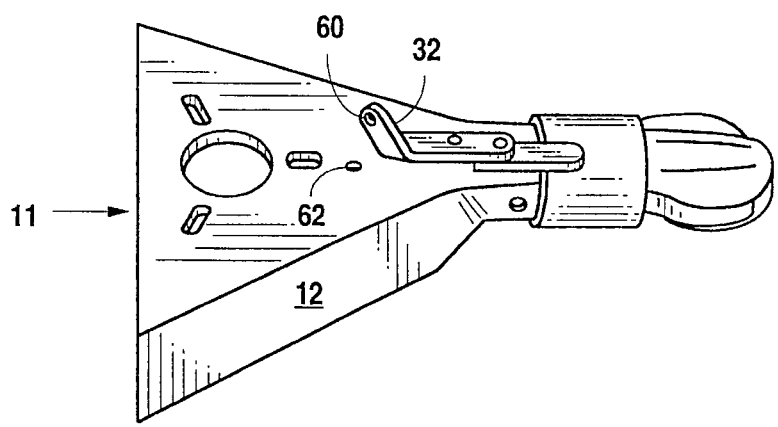
FIG. 5 illustrates the modification of the coupler for the locking system of the present invention.

Holes having 7/16" and 3/8" diameters respectively are then drilled at the center locations on end 32 and frame 12, as shown in FIG. 5. Thus, an opening 60 is formed in end 32 which is in generally perpendicular alignment with an opening 62 in the frame 12 thereby providing the modified coupler 11 of the present invention.

Figure 6:
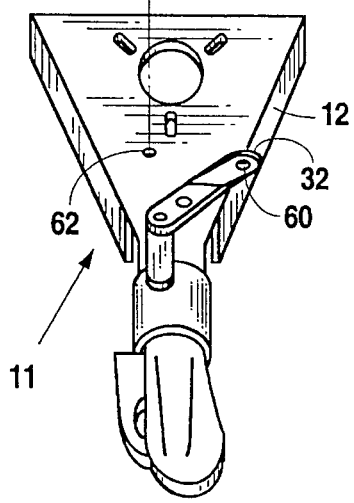
FIG. 6 shows an exploded perspective view of the locking eyelet and modified coupler of the present invention in the open position.

FIG. 6 illustrates in an exploded perspective view the lock pin 70 of the present invention with eyelet 72 on a first end 74 on the pin. Second end 76 is shown by the broken line in FIG. 6 as being insertable into opening 62 in the frame 12. Opening 62 is further defined as the lock pin opening. FIG. 6 also illustrates the modified coupler 11 in the open position. Eyelet 72 is alignable with opening 60 in end 32. Opening 60 is further defined as the hasp receiving opening.

Figure 7:
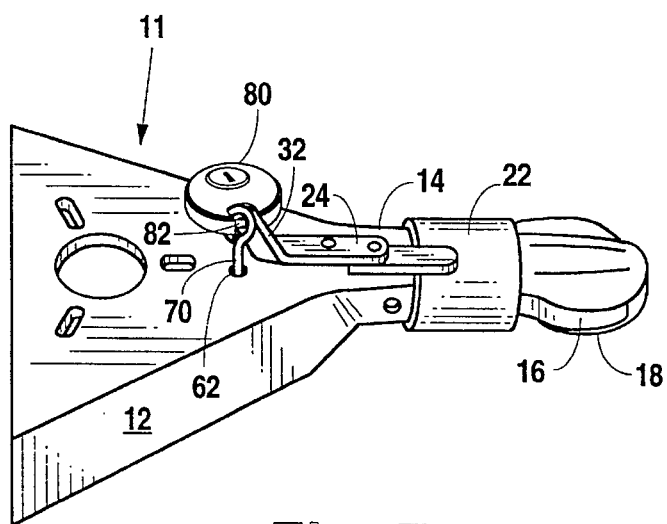
FIG. 7 illustrates the modified coupler of the present invention in the locked, closed position.

Finally, in FIG. 7 it may be seen that a maximum security lock 80 with a generally unexposed hasp member 82 may be secured to the modified coupler 11 to prevent unauthorized opening of the cavity 18. While other types of locks may be used the maximum security locks with minimum hasp exposure are preferred. Hasp member 82 passes through eyelet 72 and hasp receiving opening 60 in end 32 locking collar 22 in the closed position. Thus, as outlined above, existing couplers may be retrofitted to provide the objects of the present invention.

A kit for retrofitting a coupler attachable to a hitchball may be provided by packaging a lock pin 70 with an eyelet 72 on a first end 74 and having a second end 76 insertably removable into a lock pin opening 62 drilled in the frame 12. The eyelet 72 is alignable with a lock hasp receiving opening 60 drilled in free end 32 of lever linkage 24 when the pin 70 is inserted into opening 62 and when the collar 22 is in the closed position, as seen in FIG. 7. The kit further includes a templet 40 for locating the proper position for drilling the lock hasp receiving and the lock pin opening 62, as discussed above, and a maximum security lock having a generally unexposed hasp 82 sized to fit or pass through the eyelet and the lock hasp receiving opening to lock the collar 22 in the closed position thereby preventing unauthorized opening of the cavity 18 to remove or insert a hitchball 20.

It should be understood from the present disclosure that couplers may be originally produced with the modifications outlined in the instant description thereby providing a coupler system attachable to a hitchball which enables the user to close the cavity sufficiently to not receive a hitchball preventing the theft of the trailer to which the coupler is mounted. Further, after a hitchball is inserted into an open cavity and the collar is moved to the closed position, the hitchball will remain secure in the coupler until unlocked by an authorized person.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A coupler system attachable to a hitchball comprising:

a frame;

a tongue portion connected to a front of said frame, said tongue portion having a pivotable locking jaw forming a hitchball receiving cavity in said tongue;

a slidable sleeve collar movable rearwardly along said tongue portion to a first position to permit said locking jaw to open said cavity to receive said hitchball and movable forwardly along said tongue portion to a second position to close said cavity to prevent insertion or removal of said hitchball;

a lever for sliding said collar from said first position to said second position, said lever attached at a first end to said sleeve and pivotally attached at a midpoint to said frame, said lever having a second free end, said free end having a lock hasp receiving opening;

a lock pin with an eyelet on a first end, said pin removably insertable at a second end into a lock pin opening in said frame, said eyelet being in alignment with said lock hasp receiving opening when said pin is inserted into said lock pin opening in said frame and when said collar is in said second position whereby a lock hasp may pass through said eyelet and said lock hasp receiving opening to lock said collar in said second position.

2. A method for retrofitting a coupler attachable to a hitchball, said coupler having a frame member; a tongue portion connected to a front of said frame member, said tongue portion having a pivotable locking jaw forming a hitchball receiving cavity in said tongue; a slidable sleeve collar movable rearwardly along said tongue portion to a first position to permit said locking jaw to open said cavity to receive said hitchball and movable forwardly along said tongue portion to a second position to close said cavity to prevent insertion or removal of said hitchball; a lever for sliding said collar from said first position to said second position, said lever attached at a first end to said sleeve and pivotally attached at a midpoint to said frame, said lever having a second free end, comprising the steps of:

aligning an upper section of a templet with said second free end of said lever and a lower section with said frame;

marking a center of a circle on each said sections on said free end and said frame, respectively;

drilling a lock hasp receiving opening in said free end of said lever;

drilling a lock pin opening at a location on said frame;

inserting a second end of a locking pin with an eyelet on a first end into said lock pin opening when said collar is in said second position, said eyelet in alignment with said lock hasp receiving opening such that a lock hasp may pass through said eyelet and said lock hasp receiving opening to lock said collar in said second position.

3. A kit for retrofitting a coupler attachable to a hitchball, said coupler having a frame member; a tongue portion connected to a front of said frame member, said tongue portion having a pivotable locking jaw forming a hitchball receiving cavity in said tongue; a slidable sleeve collar movable rearwardly along said tongue portion to a first position to permit said locking jaw to open said cavity to receive said hitchball and movable forwardly along said tongue portion to a second position to close said cavity to prevent insertion or removal of said hitchball; a lever for sliding said collar from said first position to said second position, said lever attached at a first end to said sleeve and pivotally attached at a midpoint to said frame, said lever having a second free end, comprising:

a lock pin with an eyelet on a first end, said pin insertably removable at a second end into a lock pin opening in said frame, said eyelet alignable with a lock hasp receiving opening in said second free end of said lever when said pin is inserted into said lock pin opening in said frame and when said collar is in said second position;

a templet for locating the position for drilling said lock hasp receiving opening in said second free end of said lever and said lock pin opening in said frame; and a lock having a hasp adapted to pass through said eyelet and said lock hasp receiving opening to lock said collar in said second position.

* * * * *